Sept. 17, 1935.   D. L. McNEAL   2,014,948

VALVE STRUCTURE

Filed Jan. 5, 1932

INVENTOR.
DONALD L. McNEAL

By *Wm. M. Cady*

ATTORNEY.

Patented Sept. 17, 1935

2,014,948

UNITED STATES PATENT OFFICE 2,014,948

VALVE STRUCTURE

Donald L. McNeal, Wilkinsburg, Pa., assignor to The Westinghouse Air Brake Company, Wilmerding, Pa., a corporation of Pennsylvania Application January 5, 1932, Serial No. 584,769

7 Claims. (Cl. 251—161)

This invention relates to valve discs and particularly to valve discs for valve devices used in controlling the delivery of fluid under pressure to fluid controlled or actuated devices, such for example as are employed in fluid pressure brake equipment.

Heretofore valve discs adapted to cooperate with an annular seat rib and used for control and check valves, have been made of leather, rubber, or composition of a yielding character, and when such valve discs are frequently subjected to heavy spring or fluid pressure loads, they eventually become flexed and distorted to such a degree as to render them ineffective.

It is an object of this invention to provide a valve disc that may be subjected to heavy spring and fluid pressure load without becoming distorted, and which is provided with wear resisting guides for centering the valve disc upon the valve seat.

A further object of the invention is to provide a valve disc comprising a circular disc of molded yielding material in which is embedded a metal or relatively non-yielding reinforcing disc having portions that protrude slightly beyond the margin of the molded disc, and which constitute relatively non-wearing centering guides.

A further object of the invention is to provide a valve disc, having the above noted characteristics, that may be manufactured by an inexpensive molding operation and which is durable and effective.

These and other objects that will be made apparent throughout the further description of the invention are attained by means of the valve disc hereinafter described and illustrated in the accompanying drawing wherein.

Figure 1:
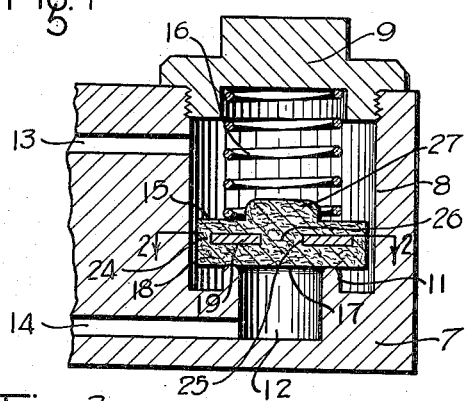
Fig. 1 is a vertical sectional view of a fragment of a valve device employing an improved valve disc.
Figure 2:
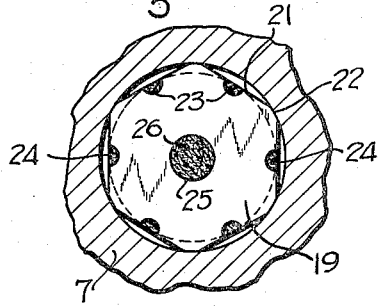
Fig. 2 is a transverse sectional view of the valve device shown in Fig. 1 taken on the line 2—2 thereof.
Figure 3:
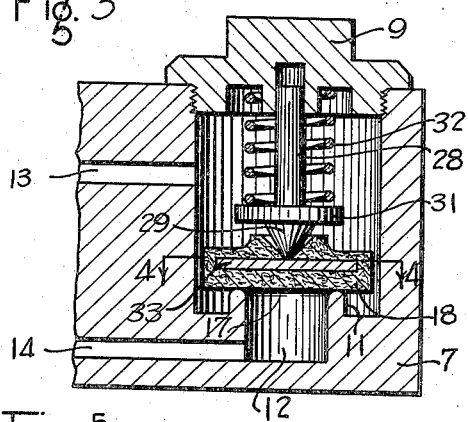
Figure 4:
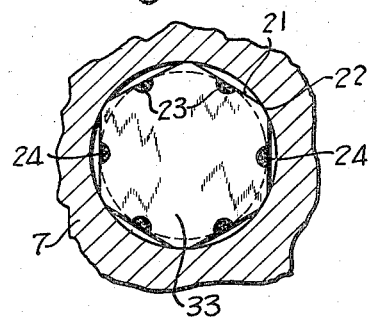
Figure 5:
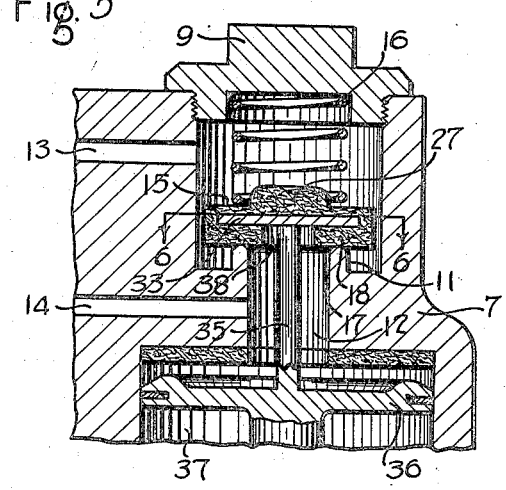
Figure 6:
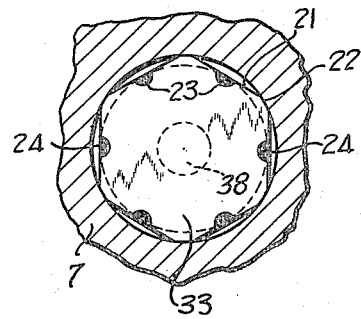

Figs. 3 and 4 are views similar, respectively, to Figs. 1 and 2, showing a modified form of valve disc, the section of Fig. 4 being taken on the line 4—4 of Fig. 3;

Figs. 5 and 6 are views similar, respectively, to Figs. 1 and 2, showing a further modified form of valve disc, the section in Fig. 6 being taken on the line 6—6 of Fig. 5.

Referring to the drawing the improved valve disc is disclosed as constituting a part of a check valve device comprising a casing 7 having a cylindrical chamber 8, one end of which is closed by a threaded cap nut 9, the other end being provided with an annular seat rib 11 which defines a chamber 12. Passages 13 and 14 open into the chambers 8 and 12, respectively.

A valve disc 15 serves to control the flow of fluid under pressure from the chamber 8 into the chamber 12, or from the chamber 12 into the chamber 8, and a spring 16 presses the disc into engagement with the seat rib 11 and normally retains the valve disc 15 seated or closed. When the pressure on the inner seated area 17 of the valve disc exceeds a predetermined amount, the valve disc is raised from its seat and permits fluid under pressure to flow from the chamber 12 into the chamber 8.

The valve disc 15 comprises a circular disc 18 that is preferably made of rubber or a composition having yielding or resilient characteristics, which renders the disc effective to retain fluid under pressure when pressed against the annular seat rib of the valve. In order to prevent deflection or distortion of the valve disc under the influence of high fluid or spring pressure, the disc is reinforced by embedding therein, during the molding operation, a metal disc 19 which is preferably octagonal in shape, the width of the disc across the flats 21 thereof being substantially equal to the diameter of the molded disc. The corner portions 22 of the disc protrude slightly from the peripheral edge of the molded disc and constitute relatively non-wearing guide portions which engage the walls of the chamber 8 and serve to center the disc upon the valve seat.

The straight edges or flats 21 of the metal disc are provided with notches 23 into which the molded material flows during the molding operation, the material in the notches forming connecting bars 24, which serve to anchor the disc in assembled position and to integrally join the molded material on opposite faces of the disc. The molded material also flows through a central opening 25 in the disc and the material in the opening constitutes an additional connecting bar 26 for bonding the material on opposite sides of the disc 19.

The disc 15 shown in Fig. 1, is provided with an integral boss or lug 27 which serves to center the spring 16 upon the valve disc. By reason of the improved valve disc construction, a valve disc is provided having a resilient body portion for engaging the valve seat and which is interiorly reinforced to prevent deflection and distortion under severe operating conditions.

Referring to Figs. 3 and 4, a modification of the valve structure is disclosed wherein a modified form of valve disc is employed. The valve disc, in this case, is retained in closed position by a stem 28, having a bearing point 29 provided with a collar 31 which serves as a seat for the spring 32. The bearing point 29 bears directly upon the center of the metal reinforcing disc 33, that is embedded in the cylindrical disc of yielding material, which, is in the case of the disc previously described, may be rubber or molded composition. The metal disc 33 is substantially the same as the metal disc 19 previously described, with the exception that there is no central opening. The flats of the disc are provided with notches 23 and the molded material on opposite faces of the metal disc are integrally joined by the bars 24 of molded material disposed in the notches.

Referring to Figs. 5 and 6, a further modification of the valve structure is disclosed wherein a further modified form of valve disc is employed. In this case, the valve disc is adapted to be operated by a stem 35 carried upon a fluid actuated piston 36 that is disposed within a chamber 37. The molded valve disc is substantially the same as that disclosed in Fig. 1, with the exception that the metal disc is not perforated at the center and the central portion of the under side of the metal disc is exposed by a central opening 38 in the molded material on the under side of the disc. The metal disc 33 is substantially the same as the metal disc shown in Figs. 3 and 4, and the stem 35 bears directly against the under face of the metal disc. An integral lug or boss 27 is provided on the upper side of the molded disc for centering the spring 16, which serves to press the valve against the annular seat rib 11 of the valve device.

It will be understood that while I have described the disc as comprising a disc made of yielding material in which a metal reinforcing disc is embedded, the reinforcing disc may be made of any relatively non-yielding material such as hard rubber, fiber, or molded composition. The material of the outer portion of the disc may, in some instances, comprise a relatively non-yielding material and the reinforcing disc may be made of metal or fibrous material for strengthening the disc.

While but three modified forms of valve discs are disclosed, it is obvious that many changes, omissions and additions may be made in the disc structure without departing from the spirit of the invention.

Having now described my invention, what I claim as new and desire to secure by Letters Patent, is:

1. A valve disc comprising a polygonal metal disc having notches in the flats of the disc and circular discs of yielding material on opposite sides of the disc having a diameter substantially equal to the minor width of the metal disc between the flats and integrally joined by yielding material extending into the said notches.

2. A valve disc comprising a polygonal flat metal disc having an imperforate central portion for engaging an operating member and a molded covering for the disc providing a resilient seat portion, the said covering overlapping the edges of the disc at points between the corners thereof and having an opening through which said central portion of the disc is exposed.

3. A valve disc comprising a flat polygonal imperforate metal disc, and a substantially cylindrical molded covering of yielding material entirely embedding said polygonal disc except for the corners thereof which protrude beyond the periphery of said molded covering, said molded covering having an aperture therein through which a central portion of the said polygonal disc is exposed to permit the end of an operating stem to engage the exposed central portion of the polygonal disc in metal to metal contact.

4. A valve disc comprising a flat polygonal disc of relatively non-yielding material and a molded covering for said polygonal disc of relatively yielding material disposed in the form of substantially disc portions on opposite sides of said polygonal disc, said polygonal disc having a central aperture therein and notches in the flat edges thereof into which aperture and notches the said molded covering extends to integrally join the circular disc portions of said molded covering.

5. A valve disc comprising a reenforcing disc having an imperforate central portion and spaced radial guide projections, and a molded covering for the reenforcing disc providing a resilient seat portion, the said covering overlapping the edges of the disc at points between the said guide projections and having an opening therein through which the imperforate central portion of the disc is exposed.

6. A valve disc comprising a reenforcing disc having an imperforate central portion and spaced radial guide projections, and a molded covering for the reenforcing disc providing a resilient seat portion, the said covering having portions on both sides of the disc overlapping the edges of the disc at points between the said guide projections and integrally joined together thereat, one of the portions of the molded covering having an opening through which the imperforate central portion of the reenforcing disc is exposed.

7. A valve disc comprising an imperforate reenforcing disc having spaced radial guide projections, and a molded covering of yielding material having portions on both sides of said reenforcing disc, the portions of the molded covering being integrally joined together past the edge of the disc at points between the guide projections, and one of the portions having an opening through which a portion of one side of the imperforate disc is exposed.

DONALD L. McNEAL.